United States Patent [19]

Buxbaum et al.

[11] 4,166,895
[45] Sep. 4, 1979

[54] COPOLYESTER FROM 1,4-BUTANEDIOL AND A DICARBOXYLIC ACID MIXTURE

[75] Inventors: Lothar Buxbaum, Lindenfels, Fed. Rep. of Germany; Rolf Hugi, Ramlinsburg, Switzerland

[73] Assignee: Ciba-Geigy Corporation, Ardsley, N.Y.

[21] Appl. No.: 905,624

[22] Filed: May 15, 1978

[30] Foreign Application Priority Data

May 18, 1977 [CH] Switzerland .......................... 6210/77

[51] Int. Cl.² .............................................. C08G 63/18
[52] U.S. Cl. ...................................... 528/272; 156/331;
260/22 CB; 260/22 D; 528/296; 528/302; 528/309
[58] Field of Search ............... 528/272, 296, 302, 309; 260/22 CB, 22 D, 22 R; 156/331

[56] References Cited

U.S. PATENT DOCUMENTS

| | | | |
|---|---|---|---|
| 3,421,974 | 1/1969 | Wiener | 528/302 |
| 3,436,301 | 4/1969 | McHale | 156/331 X |
| 3,682,863 | 8/1972 | McHale | 528/302 |
| 3,859,257 | 1/1975 | Schade et al. | 528/272 |
| 4,062,907 | 12/1977 | Sublett | 528/302 |

*Primary Examiner*—Lucille M. Phynes
*Attorney, Agent, or Firm*—Luther A. R. Hall

[57] ABSTRACT

Copolyesters formed from 1,4-butanediol and a dicarboxylic acid mixture of, relative to the polyester, 8–12 mol % of sebacic acid or of an amount equal by weight of a saturated aliphatic dicarboxylic acid having 6 to 36 C atoms, 26–32 mol % of terephthalic acid and 7.5 to 12 mol % of isophthalic acid are hot melt adhesives which are characterized by resistance to ageing even at elevated temperatures, good adhesive strength and a relatively high heat resistance of the bonded areas.

5 Claims, No Drawings

COPOLYESTER FROM 1,4-BUTANEDIOL AND A DICARBOXYLIC ACID MIXTURE

The present invention relates to copolyesters formed from aromatic and aliphatic dicarboxylic acids and 1,4-butanediol, to processes for producing them, and to their use as hot melt adhesives (thermoplastic adhesives).

Hot melt adhesives based on saturated polyesters have been known for a considerable time. The diols frequently used in these polyesters are mainly ethylene glycol and 1,4-butanediol.

It has then been the aim, by a suitable choice of dicarboxylic acids, to impart to the polyesters properties that render them applicable for use as hot melt adhesives. Copolyesters of this type, which contain terephthalic acid and isophthalic acid as well as aliphatic dicarboxylic acids, are described for example in the German Offenlegungsschrift No. 1,594,216 and in the German Auslegeschrift No. 1,570,690. These copolyesters however can have disadvantages when used as hot melt adhesives. Thus for example the heat resistance of the areas which are bonded is found to be inadequate.

The object of the present invention is to provide this type of modified copolyesters but with improved properties. In particular, these new polyesters are intended to have better heat resistance with high adhesive strength.

The subject matter of the present invention is a copolyester having a relative minimum viscosity of 2,2, measured at 30° C. on solutions of 1 g of polyester in 100 ml of solvent consisting of equal parts of phenol and symmetrical tetrachloroethane, which copolyester is the reaction product from 1,4-butanediol and a dicarboxylic acid mixture of, relative to the polyester, 8-12 mol % of sebacic acid or of an amount equal by weight of a saturated aliphatic dicarboxylic acid having 6 to 36 C atoms, 26-32 mol % of terephthalic acid and additionally isophthalic acid or polyester-forming derivatives thereof, characterised in that the isophthalic acid is present in an amount of 7.5 to 12 mol %.

The amount of isophthalic acid is preferably 7.5-10 mol %, particularly 9-10 mol %. In a particularly preferred composition, the proportion of sebacic acid and isophthalic acid is 10 mol % of each. The terephthalic acid is present preferably in an amount of 30-31.5 mol %.

The relative viscosity is preferably above 2.5 and particularly above 3.0, and is limited upwards to a value of about 5.0.

By acid-forming derivatives are meant, for example, the dicarboxylic acid dihalides, preferably the chlorides, and the dicarboxylic acid esters, for example the lower alkyl esters and phenyl esters.

In addition to, or in place of, sebacic acid, it is possible to use other aliphatic, preferably acyclic, dicarboxylic acids in an amount equal by weight, e.g. azelaic acid, adipic acid, trimethyladipic acid, 1,10-decanedicarboxylic acid, suberic acid or dimeric acid. These last-mentioned are dimerisation products of unsaturated acids, e.g. of oleic acid, which are also obtainable commercially.

A part, namely 0.025-0.25 mol %, preferably 0.05-0.15 mol %, of the butanediol and/or of the dicarboxylic acids can be replaced by compounds which are at least trifunctional and which have ester-forming functions. Ester-forming functions are, e.g., hydroxyl or carboxyl groups. Examples of such compounds are: glycerol, trimethylolethane, pentaerythritol or trimellitic acid.

The copolyesters according to the invention can be produced, using known processes, by catalytically condensing the dicarboxylic acids, or polyester-forming derivatives thereof, together with 1,4butanediol. The conditions of the process are in general so designed that polyesters with a statistical distribution of the monomers are obtained. The procedure can however also be such that block polyesters are obtained, for example by polycondensing precondensates of homopolyesters (polybutylene terephthalate, polybutylene isophthalate and polybutylene sebacate) in corresponding proportions.

The known processes are, for example, condensation in solution or azeotropic condensation, interfacial, melt or solid-phase condensation, and also combinations of these methods. Methods are given in greater detail for example in the German Offenlegungsschrift No. 2,453,450.

The copolyesters according to the invention are partially crystalline with melting points above about 130° C. to 160° C. and with low glass transition temperatures (about −5 to +10° C.). The degree of crystallinity is approximately between 5 and 15%. These copolyesters are excellently suitable as hot melt adhesives for substrates of various kinds, such as wood, metal, glass, ceramics and plastics, for example in the manufacture of furniture, in the automobile industry, in the production of tins for food, for the fixing of decorative elements on ornamental articles, in the electrical and textile industries, and also in the foundry industry for sealing sand moulds, in the packing industry and in bookbinding.

Different processing techniques will be used depending on the fields of application, for example roll-coating or nozzle-coating processes (spread coating or spraying) above the melting temperature. It is also possible to apply solutions of the copolyesters in suitable solvents to the surfaces of the substrate, and to effect bonding above the melting temperature of the copolyester either during or after evaporation of the solvent, such as methylene chloride. Furthermore, it is possible also to firstly produce sheets or filaments from the new copolyesters, and to then coat with these sheets or filaments the substrate surfaces to be bonded. The bonding itself is completed by exerting pressure and heat.

The copolyesters according to the invention can also contain customary additives, for example waxes and plasticisers, such as long-chain aliphatic compounds (fatty alcohols). They can also be used in admixture with other polymers for bonding, in which case the content of copolyester is usually at least 10% by weight, e.g. 10 to 90% by weight, relative to the total amount of mixture. Polymers suitable for admixing are, for example, epoxy resins, nitrocellulose, vinyl chloride/vinyl acetate copolymers, isocyanate resins, triazine-formaldehyde resins and polyketones.

The copolyesters according to the invention have balanced properties which render possible a wide variety of applications. They impart excellent adhesive strength, a factor which has to be considered surprising since copolyesters having a lower content of isophthalic acid impart only slight adhesive strength. Surprisingly, adhesive joints made with copolyesters according to the invention have a heat resistance which is greater than that of those having a higher content of isophthalic acid. The new copolyesters are moreover relatively stable to hydrolysis, have a low brittle temperature and have a surprisingly high resistance to ageing. The outstanding adhesive properties are demonstrated particularly by the high tensile strength and peel strength obtained. In spite of relatively high flow temperatures, the copolyesters according to the invention can be applied, by virtue of their favourable melt viscosity behaviour and their surprisingly high thermal stability, over a wide range of temperature (about 200°–280° C.).

The copolyesters produced according to the following Examples are more precisely characterised by the following characteristic values. The copolyesters are characterised by those morphological changes which are measured by means of differential thermoanalysis on a specimen tempered for 3 minutes at 30° C. above the melting point or softening point and then rapidly quenched. The quenched specimen is heated at a heating rate of 16° C./minute by means of the differential scanning calorimeter "DSC-1B", Perkin-Elmer. The thermogram of the specimen shows the glass transition temperature ($T_g$), the crystallisation temperature ($T_c$) and the melting temperature ($T_m$). The point of inflection where there occurs a sudded increase in the specific heat in the thermogram is given as the glass transition temperature; the tip of the exothermal peak as the crystallisation temperature; and the tip of the endothermic peak as the melting temperature. The relative viscosity of the polycondensates of the Examples is determined at 30° C. on solutions of 1 g of copolyester in 100 ml of a mixture consisting of equal parts of phenol and symmetrical tetrachloroethane. The softening temperature ($T_s$) is determined on a hot-stage microscope according to Kofler with a heating-up rate of 15° C./minute, by which system a cross is formed from 2 filaments, and the softening temperature is defined as being that temperature at which the sharp angles of the cross disappear.

The following test methods are used to determine the adhesive properties:

(a) the tensile shearing strength is determined according to DIN 53 283;

(b) the heat resistance is defined in terms of the temperature at which the tensile shearing strength according to DIN 53 283 falls to a value of 6 N/mm$^2$;

(c) the residual tensile shearing strength after storage in cold water is determined by measuring the tensile shearing strength after storage of the specimens in water at 23° C. for a certain period of time;

(d) the resistance to tropical conditions is determined by measurement of the tensile shearing strength after storage of the specimens under tropical conditions (42° C., relative humidity 92%); the storage time is given in this case;

(e) the resistance to ageing is determined by measuring the tensile shearing strength of the specimens after storage at 40° C., 80° C. and 120° C. for a certain length of time; and (f) the peel strength is determined according to the standard method DTD 5577.

EXAMPLE 1

Into a 10 liter reactor, fitted with stirrer, nitrogen inlet, separating column and temperature measuring device, are fed 2328 g of dimethyl terephthalate (DMT), 776 g of dimethyl isophthalate (DMI), 921.3 g of sebacic acid dimethyl ester (SDM), 3600 g of butanediol-1,4 and 2.29 g of titanium tetraisopropylate as catalyst, and the mixture is heated to 140° C. With stirring and the introduction of nitrogen, there is distilled off in the course of 2.5 hours 97% of the amount to be expected theoretically of methanol, in which time the temperature of the reaction mixture rises to 218° C. The transesterification product thus obtained is transferred to a second reactor and, after heating of the reaction mixture to 240° C., a vacuum of 60 Torr is applied with a water-jet pump within ½ hour. With raising of the reaction temperature to 250° C., the vacuum is increased with a vacuum pump to 0.7 Torr in the course of 30 minutes. Reaction temperature and vacuum are then kept under these reaction conditions during 4.5 hours. The vacuum improves in the course of the reaction to 0.25 Torr. The reactor is afterwards emptied, and the copolyester obtained with a relative viscosity of 2.63 is granulated. The molar ratio of the monomers in the copolyester is 0.3:0.1:0.1:0.5 (above sequence of dicarboxylic acids).

On application of the product as hot melt adhesive, the following properties are measured:

| | |
|---|---|
| tensile shearing strength at 20° C.: | 15.5 N/mm$^2$ |
| peel strength at 20° C.: | 5–6 N/mm |
| heat resistance: | 80°–100° C. |
| residual tensile shearing strength after 90 days storage in cold water: | 8.0 N/mm$^2$. |

| Temperature °C. | Tensile shearing strength (N/mm$^2$) |
|---|---|
| −60 | 20.2 |
| −40 | 16.1 |
| −20 | 17.9 |
| 0 | 18.0 |
| 20 | 15.5 |
| 40 | 13.7 |
| 60 | 10.7 |
| 80 | 12.2 |
| 100 | 6.5 |
| 120 | 3.3 |

| Tensile shearing strength after storage in cold water | |
|---|---|
| 0 days | 15.5 N/mm$^2$ |
| 10 days | 12.5 N/mm$^2$ |
| 30 days | 9.0 N/mm$^2$ |
| 60 days | 9.8 N/mm$^2$ |

| Tensile shearing strength after storage under tropical conditions | |
|---|---|
| 0 days | 15.5 N/mm$^2$ |
| 10 days | 12.0 N/mm$^2$ |
| 30 days | 11.8 N/mm$^2$ |
| 60 days | 9.8 N/mm$^2$ |

| | Resistance to ageing (N/mm$^2$) | | |
|---|---|---|---|
| Days | 40° C. | 80° C. | 120° C. |
| 0 | 16.3 | 16.3 | 16.3 |
| 10 | 17.4 | 18.4 | 20.3 |
| 30 | 16.4 | 17.8 | 21.8 |
| 60 | 15.5 | 16.9 | 19.2 |
| 90 | 16.8 | 17.8 | 19.1 |

EXAMPLE 2 AND COMPARATIVE EXAMPLES

By a procedure analogous to that described in Example 1, copolyesters having the composition given in the following Table are produced, and their hot melt adhesive properties are measured.

| Example No. | 2 | Comparative Example I | Comparative Example II |
|---|---|---|---|
| molar ratio | 31.25:8.75:10:50 | 33.75:6.25:10:50 | 25:15:10:50 |
| $\eta$rel | 2.86 | 2.90 | 2.78 |
| crystallisation temperature ($T_c$) °C. | 29 | 24 | 60 |
| glass transition temperature ($T_g$) °C. | 5 | 3 | 3 |
| melting point (°C.) | 152 | 166 | 120 |
| crystall. degree (%) | 13 | 13 | — |
| tensile shearing strength (20° C.) (N/mm$^2$) | 15.5 | delaminated | 16.3 |
| peel strength (N/mm) | 2–5 | delaminated | 3–6 |
| residual tensile shearing strength after 60 days' storage in water at 23° C. | 3.3 | delaminated | 7.4 |
| heat resistance (°C.) | 80–100 | delaminated | 50 |

From the Comparative Example I are to be seen the poor adhesive properties, and from the Comparative Example II the lower heat resistance of copolyesters known hitherto.

EXAMPLE 3

A copolyester of the same composition as in Example 1 is synthetised, in the process of which a third of the charge (I) is removed 25 minutes after attainment of a vacuum of 0.9 Torr; the second third (II) is removed after a further 40 minutes, the vacuum having improved to 0.2 Torr; and the remainder (III) is removed after a further 60 minutes. The copolyesters have the following properties:

| No. | $\eta$ rel | Tensile shearing strength N/mm$^2$ (20° C.) | Peel strength N/mm | Heat resistance °C. | Residual[1] tensile shearing strength N/mm$^2$ |
|---|---|---|---|---|---|
| I[2] | 1.67 | 9.9 | — | 40 | delaminated |
| II | 2.41 | 14.2 | 5–6 | 60 | 5.2 |
| III | 3.05 | 16.3 | 6–7 | 80 | 8.9 |

[1] after 90 days storage in water
[2] comparative Example

| Example No. | Composition | Molar Ratio | $\eta$rel | $T_m$ (°C.) | Tensile shearing strength at RT (N/mm$^2$) | Heat resistance (°C.) | Residual tensile shearing strength at RT[2]* (N/mm$^2$) |
|---|---|---|---|---|---|---|---|
| 4 | DMT+DMAZ+DMI+B14 | 0.28:0.10:0.12:0.5 | 2.86 | 148 | 15.3 | 83 | 3.5 |
| 5 | DMT+DMAZ+DMI+B14 | 0.26:0.12:0.12:0.5 | 2.81 | 127 | 15.8 | 84 | 9.7 |
| 6 | DMT+DMAZ+DMI+B14 | 0.30:0.08:0.12:0.5 | 2.58 | 150 | 17.3 | 100 | 8.6 |
| 7 | DMI+B14+DMT+APSDE | 0.1:0.5:0.26:0.14 | 3.29 | 129 | 15.4 | 84 | 8.5 |
| 8 | DMI+B14+DMT+DDS | 0.1:0.5:0.31:0.09 | 3.41 | 153 | 16.4 | 97 | 6.6 |
| comparative Example | DMT+DMAZ+DMI+B14 | 0.25:0.125:0.125:0.5 | 2.62 | 122 | 14.7 | 68 | 8.8 |

DMT = dimethyl terephthalate
B 14 = butanediol-1,4
DMAZ = dimethyl azelate
DDS = decanedicarboxylic acid
DMI = dimethyl isophthalate
APSDE = adipic acid diethyl ester
*residual tensile shearing strength after 60 days' storage in water
RT = room temperature

We claim:

1. A copolyester which has a relative viscosity of at least 2.2, measured on a solution of 1 gram of polyester in 100 ml of a solvent consisting of equal parts of phenol and symmetrical tetrachloroethane at 30° C., which comprises the condensation product in about a 1:1 molar ratio of diacids (a), (b) and (c) with 1,4-butanediol (d) so that the composition of the polyester comprises in the diacid component of the polyester (a) from 8 to 12 mol %, based on the total polyester, of radicals of sebacic acid or of radicals from an amount equal by weight of a saturated dicarboxylic acid having 6 to 36 carbon atoms;

(b) from 26 to 32 mol %, based on the total polyester, of radicals of terephthalic acid; and (c) from 7.5 to 12 mol %, based on the total polyester, of radicals of isophthalic acid; and in the diol component of the polyester (d) 50 mol %, based on the total polyester, of radicals of 1,4-butanediol; wherein the radicals (a), (b) and (c) are attached to radicals (d) through ester linkages in a random distribution.

2. A copolyester according to claim 1 wherein the amount of component (c) is from 7.5 to 10 mol % of the total polyester.

3. A copolyester according to claim 2 wherein the amount of component (c) is from 9 to 10 mol % of the total polyester.

4. A copolyester according to claim 1 wherein component (a) is 10 mol % of radicals of sebacic acid, based on the total polyester, and component (c) is 10 mol % of the total polyester.

5. A copolyester according to claim 1 wherein from 0.025 to 0.25 mol %, based on the total polyester, of component (a), (b) or (c) is replaced by radicals of trimellitic acid, or wherein from 0.025 to 0.25 mol %, based on the total polyester, of component (d) is replaced by radicals of a polyol having at least three hydroxy groups, or wherein said copolyester contains radicals of both trimellitic acid and a polyol having at least three hydroxy groups.

* * * * *